Jan. 9, 1968    L. R. STEELE ET AL    3,362,212
TUBE MACHINE
Filed April 13, 1965    2 Sheets-Sheet 2

INVENTORS.
Luther R. Steele
George J. Persico
BY
Harness, Dickey & Pierce
ATTORNEYS.

United States Patent Office 3,362,212
Patented Jan. 9, 1968

3,362,212
TUBE MACHINE
Luther R. Steele and George J. Persico, Racine, Wis., assignor to Walker Manufacturing Company, Racine, Wis., a corporation of Delaware
Filed Apr. 13, 1965, Ser. No. 447,730
1 Claim. (Cl. 72—402)

ABSTRACT OF THE DISCLOSURE

A machine for sizing the end of a tube has six radially movable but axially fixed collets with tapered outer faces that engage a tapered face on an axially movable slide that cams them inwardly to compress and size a tube end.

---

Our invention relates to a device for performing operations in an end of a part such as a tube or pipe.

It is an object of our invention to provide a tube end forming device in which longitudinal motion of a power source, such as an hydraulic cylinder, is changed into a radial force applied to the end of a tube.

Figure 1:
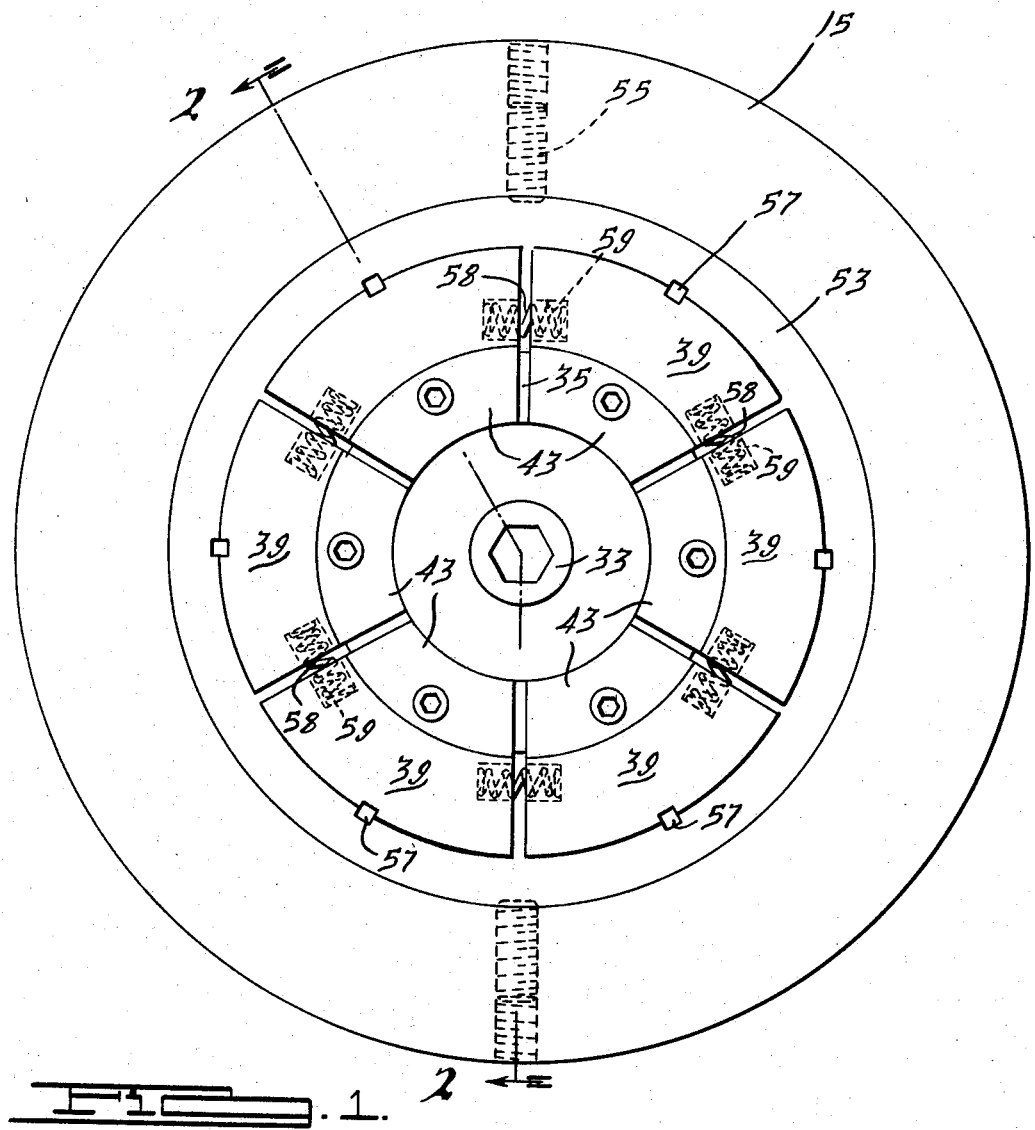
Figure 2:
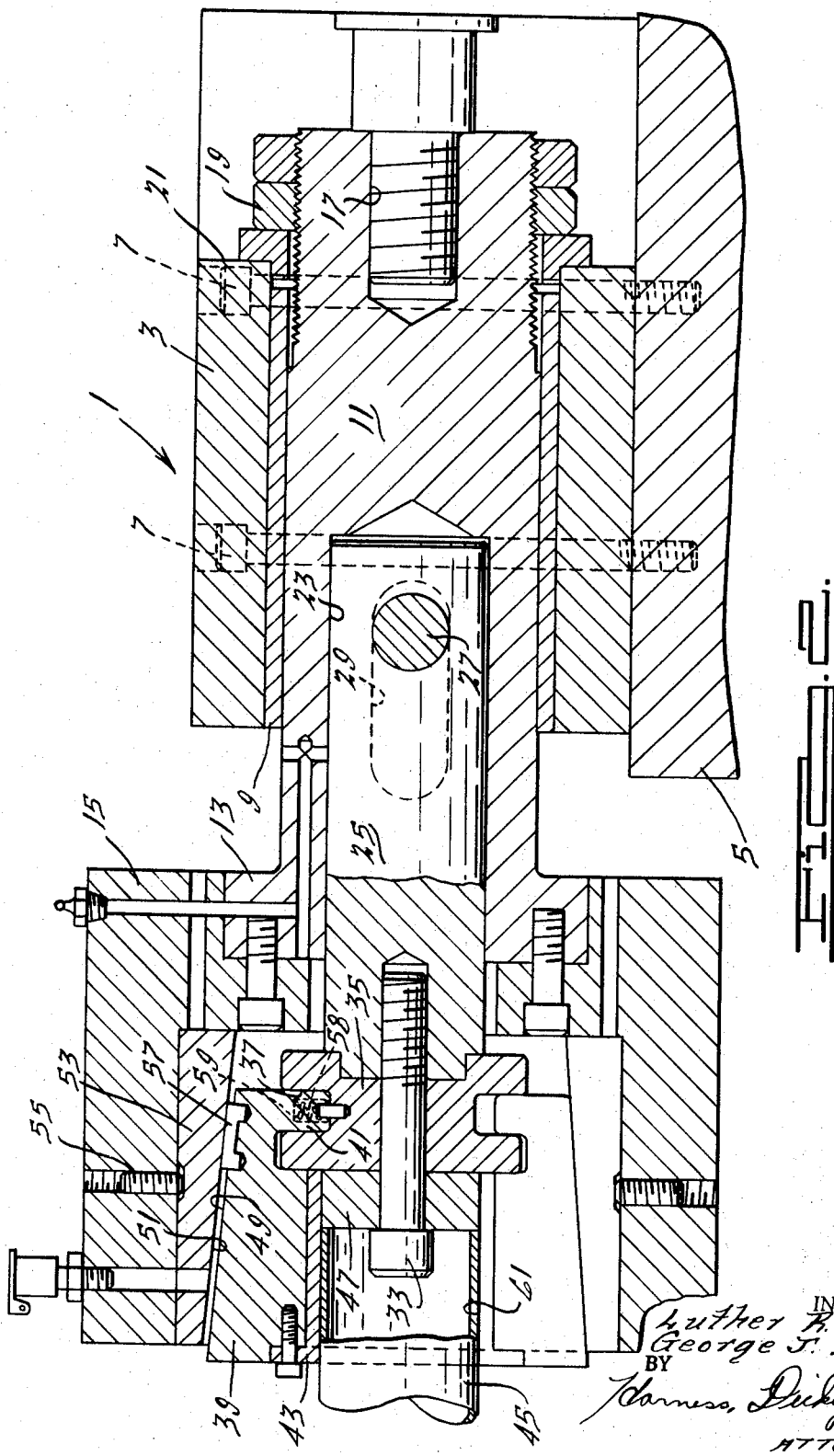

The invention is illustrated in the accompanying drawings in which:

FIG. 1 is an end view of the device taken at the tube receiving end of the device, and FIG. 2 is a reduced cross section, partly broken away, along the line 2—2 of FIG. 1.

The present device 1 for performing an operation on the end of a steel tube or the like includes a housing 3 that is fixed in position on a base or table 5 by means of bolts 7. Supported in a bushing 9 inside the housing 3 is a slide 11 which has an enlarged or flanged end 13 to which is bolted a sleeve 15. The other end of the slide 11 is internally threaded at 17 for attachment to the piston rod of a hydraulic cylinder (not shown) whereby the slide can be reciprocated. Stop washers 19 may be threaded on the outside of the slide 11 to engage a shoulder 21 on the housing 3 to determine the leftward limit of travel of the slide 11.

Inside an opening 23 in the slide 11 is a stationary bar 25 which is held in fixed position by a transverse holding bar 27 that fits on opposite ends in the housing 3. Suitable slots 29 in the slide 11 permit relative movement between the slide and bar. Attached by bolt 33 to the end of bar 25 is a collet holder 35 that has an annular groove 37 opening from its outer periphery. Six sizing collets 39 in the form of circular segments have flanges 41 that fit in the groove 37 whereby the longitudinal or axial position of the collets is fixed but radial movement thereof is permitted. The collets may have flanged wear plates 43 bolted to them and arranged to engage the outside of a tube 45 to be sized. The washer 47, which is held in place by bolt 33, fixes the axial position of the tube 45.

The outer peripheries 49 of the collets are tapered and adapted for engagement with the tapered inner face 51 of a sizing head 53 that is held in position inside of slide sleeve 15 by screws 55. Keys 57 working in suitable keyways in the head 53 and collets 39 to hold them in their angular positions. Coil springs 58 acting between adjacent collets in openings 59 urge them to expanded position.

In operation, (and assuming that the collets 39 are in the radially expanded rather than the contracted position illustrated) a pipe or tube 45 is inserted by an operator into the opening 61 defined by the inner surfaces of the collets 39 until it butts the stop washer 47. The actuator cylinder (not shown) is energized to move the slide 11 to the left. This moves the head 53 to the left to cam the collets 39 radially inwardly to radially compress and size the inserted end of the tube.

Modifications may be readily made to adapt the device to perform other operations on a tube end. By means of simple changes the working forces can be applied in a radial outward direction instead of the radial inward direction shown as by fixing the longitudinal position of the slide 11 (or its equivalent) by attachment to housing 3 and connecting the bar 25 (or its equivalent) to the hydraulic cylinder.

What is claimed is:

1. A tube end forming machine comprising a housing, a reciprocatory slide supported inside the housing, said slide having a central aperture opening out of one end and diametrically aligned slots on opposite sides thereof opening into said aperture, a stop bar in said aperture and a cross pin on said bar and extending through said slots to secure the bar in fixed position to said housing, a collet holder having a radially extending annular groove therein attached to said stop bar, six collets arranged in a circular pattern having flanges extending into said annular groove, spring means acting on the collets to urge them to an outward radially expanded position, the outer faces of said collets being tapered, a cam sleeve attached to said slide for movement therewith and having a tapered inner face engageable with the tapered outer faces of the collets for camming them inwardly upon movement of the slide, keys interconnecting the sleeve and collets to maintain the angular positions of the collets, and a stop face on the end of the stop bar for engaging the end of a tube to be sized by the machine.

References Cited

UNITED STATES PATENTS

| 579,214 | 3/1897 | Adams | 72—402 |
| 3,157,305 | 11/1964 | Baugh | 72—402 X |

CHARLES W. LANHAM, *Primary Examiner.*

R. D. GREFE, *Examiner.*